Nov. 3, 1959 N. L. M. ROUCHE 2,911,149

CALCULATING MEANS

Filed Aug. 8, 1956 5 Sheets-Sheet 1

Inventor
N. L. M. ROUCHE
By Robert Harding Jr.
Attorney

Inventor
N. L. M. ROUCHE
By Robert Harding Jr.
Attorney

CALCULATING MEANS

Filed Aug. 8, 1956 5 Sheets-Sheet 3

Inventor
N. L. M. ROUCHE
By Robert Harding Jr.
Attorney

Inventor
N. L. M. ROUCHE
By Robert Harding Jr.
Attorney

Nov. 3, 1959 N. L. M. ROUCHE 2,911,149

CALCULATING MEANS

Filed Aug. 8, 1956 5 Sheets-Sheet 5

Inventor
N. L. M. ROUCHE
By Robert Harding Jr.
Attorney

United States Patent Office 2,911,149

Patented Nov. 3, 1959

2,911,149

CALCULATING MEANS

Nicolas Louis Marcel Rouche, Antwerp, Belgium, assignor to International Standard Electric Corporation, New York, N.Y., a corporation of Delaware Application August 8, 1956, Serial No. 602,857

Claims priority, application Netherlands September 17, 1955

7 Claims. (Cl. 235—153)

The invention relates to calculating means and more particularly to means for calculating a digital function which can take any value out of $p$ different digital values from 0 to $p-1$, where $p$ is a predetermined integer.

Such calculations are required, for example in the case of numbers, the digits of which satisfy the same predetermined function for any number. Then, when these numbers have, for instance, to be keyed by an operator, as the digits of the number are keyed, this predetermined function is calculated and if another value than the correct value is found, this indicates that the operator has made a mistake.

The following type of function is particularly useful in order to determine in all cases if a single digital error has been made or if a single transposition of two digits has occurred $$\sum_{i=1}^{i=n} k_i a_i \text{ mod. } p \qquad (1)$$

$a_1, a_2, \ldots a_n$ represent the $n$ digits of the number, $a_1$ being the digit of highest rank, $k_1, k_2, \ldots k_n$ represent coefficients which may be independent of the value of the digits but which depend on the rank. It is clear that such a function can only have $p$ different values since the least non-negative residues with respect to $p$ are always taken. Hence, one should be solely concerned with integers from 0 to $p-1$ since any other integer of higher value will in fact be treated as one of this group of $p$ digits since the least non-negative residue with respect to $p$ will be taken.

Suitable values for the coefficients $k_1$ and for $p$ have already been discussed in application of M. Linsman, Serial No. 484,715, filed January 28, 1955. To summarize, if any single digital error is to be detected, the product of any coefficient by any number from 1 to $p'-1$ should be different from 0 when taking the least non-negative residue with respect to $p$, $p'$ ($p' \leqslant p$) being the radix of the numbers. On the other hand, if any single transposition of two different digits occupying different ranks is to be detected, the product of the difference between any two coefficients by any number from 1 to $p'-1$ should also be different from 0 when taking the least non-negative residue with respect to $p$. For decimal numbers a convenient scheme is to use $p=11$, since the second above condition can then be satisfied for ten consecutive ranks as one can assign the coefficients 1 to 10 in any suitable order to these ranks, while the first above condition is always satisfied. For other bases, other values for $p$ might be chosen but it should be remarked that once a value of $p$ has been chosen which is suitable to satisfy the above two relations and which is therefore higher than or equal to the base, the latter does not play a particular part in the computation of the function of the general type mentioned above. When using $p=11$ for decimal numbers for some values of $n-1$ digits of an $n$-digit number, it will be found that the $n$th digit has to be equal to 10 to result in the function of the type mentioned above giving the predetermined value for all the numbers. This means that the numbers are really on the scale of 11 but if the decimal notation is to be retained one can simply omit those numbers which would include the "digit 10."

An arrangement has already been described in said above mentioned application to compute a function of the type given by (1).

An object of the invention is to generalize the arrangement previously disclosed.

In accordance with a first characteristic of the invention, calculating means to calculate a digital function which can take any value out of $p$ different digital values from 0 to $p-1$, where $p$ is a predetermined integer, are characterised by the inclusion of a first and a second counter each with at least $p$ stable and distinct conditions and each able to be stepped cyclically from one condition to the next, $p$ steps causing the return of the counter to its initial condition, and by the fact that starting with the first counter in a first initial condition and with the second counter in a second initial condition, said first counter is stepped at one rate while simultaneously said second counter is stepped at $r$ times said rate, $r$ being an integer, means being provided simultaneously to stop this stepping action for both counters when said first counter reaches a first predetermined condition, and that with said first counter in said first predetermined condition and with said second counter in the condition attained, said second counter is then stepped at one rate while simultaneously said first counter is stepped at $s$ times said rate, $s$ being an integer, means being provided simultaneously to stop the stepping action for both counters when said second counter reaches a second predetermined condition, whereby the condition finally attained by said first counter is a digital function of the initial conditions of the first and the second counters and defined by $$x_{i+1} \equiv s(rx_i - y_i) \text{ mod. } p \qquad (2)$$

where $x_1$ is the number of steps required to bring the first counter from said first initial condition to said first predetermined condition, $y_1$ is the number of steps required to bring the second counter from said second initial condition to said second predetermined condition, and $x_{i+1}$ is the number of steps required to bring the first counter from the condition finally attained to said first predetermined condition.

If the Relation 2 above is used $n$ times, starting with the initial conditions $x_1$ for the first counter and $y_1$ for the second counter, and each time placing the second counter in a new condition, such as $y_2, y_3, \ldots y_n$, the final condition $x_{n+1}$ of the first counter will be given by $$x_{n+1} \equiv (rs)^n x_1 - s \sum_{i=1}^{i=n} (rs)^{n-i} y_i \qquad (3)$$

This relation should be assumed to be valid when taking the least non-negative residues with respect to $p$ but in order to simplify the notation, mod. $p$ is no longer used in this or further relations, but the sign $\equiv$ will be retained.

Each condition of the second counter $y_1, y_2 \ldots y_n$ can correspond to a digit of a number, i.e. the conditions and the digits form isomorphic groups. Various functions are suitable provided they uniquely define the digits. For example, the cube of each decimal digit from 0 to 9 could be used since this produces 10 different digits with a unique correspondence with the original digits when taking the least non-negative residues with respect to 11. On the other hand the square of the digits would not be a suitable function with 11 as modulus, since such a unique correspondence would not then be produced. Similarly, the first and the last conditions, $x_1$ and $x_{n+1}$ of the first counter could also be similar functions of the digits.

Moreover, the correspondence between the digits and the conditions of the first counter need not necessarily be exactly the same as that between the digits and the conditions of the second counter. This was already the case in the embodiment disclosed in the application mentioned above. In general, one can use a first linear relationship between the digits and the conditions of the first counter and a second linear relationship between the digits and the conditions of the second counter, i.e.

$$x_1 \equiv u_1 b_1 + u_0 \qquad (4)$$

$$x_{n+1} \equiv u_1 b_{n+1} + u_0 \qquad (5)$$

$$y_1 \equiv v_1 a_1 + v_0 \qquad (6)$$

where $b_1$ and $b_{n-1}$ are the digits respectively corresponding with the conditions $x_1$ and $x_{n+1}$ of the first counter and where $a_1$ is the digit corresponding to $y_1$ on the second counter. The parameters $u_0$, $u_1$, $v_0$ and $v_1$, defining the two linear relationships are predetermined integers between 0 and $p-1$ for $u_0$ and $v_0$ and between 1 and $p-1$ for $u_1$ and $v_1$.

Relation 3 can then be transformed by using Relations 4, 5, 6 to give a relation giving the final digit on the first counter as a function of the first digit originally stored on the first counter, and of the various digits $a_1\ a_2\ \ldots\ a_n$ successively stored on the second counter, i.e.

$$b_{n+1} \equiv (rs)^n b_1 + \frac{(rs)^n - 1}{u_1(rs-1)}(rsu_0 - u_0 - sv_0) - \frac{sv_1}{u_1}\sum_{i=1}^{i=n}(rs)^{n-i}a_i \qquad (7)$$

There are three terms in the right-hand part of the relation and only the third is a function of the various digits of the number. It will be recognized that this function is of the general type given by (1). Hence, with the various parameters all predetermined, if the digits of any number satisfy the Relation 7, one can ensure that with a single digital error or with a single transposition of two digits, Relation 7 shall not be satisfied and the error can be detected. Of course, any other type of error has only one chance out of $p$ of being unnoticed. It is clear that the parameters $u_0$, $v_0$, $b_1$ and $b_{n+1}$ merely complicate the Relation 7. The only possible advantage of not having these four parameters equal to 0 appears to render the function more complicated and hence more difficult to reproduce by some unauthorized party. When these four parameters are equal to 0, Relation 7 simply becomes $$\sum_{i=1}^{i=n}(rs)^{n-i}a_i \equiv 0 \qquad (8)$$

It will be observed that the effective coefficients which multiply each digit and which are functions of the ranks occupied by the digits form a cyclic group, i.e. a group whose elements can all be expressed as powers of a single element. The law of formation for this group is multiplication followed by reduction to the least positive residues with regard to $p$. The order of this group, i.e. the number of its elements, can evidently not be higher than $p-1$ and if a group of order $p-1$ can be obtained, this means that transpositions of any two digits occupying any two ranks out of $p-1$ consecutive ranks can always be detected with absolute certainty. With $p=11$, $rs=1$ will merely give a group of order 1 comprising only unity. In that case all the coefficients are equal, transpositions cannot be detected and only digital errors can be traced. With $rs=10$, a group of order 2 comprising 1 and 10 can be obtained. In this case, transpositions of adjacent digits can always be detected. With $rs=3$, 4, 5 or 9, a group of order 5 comprising the elements 1, 3, 4, 5 and 9 is generated. The order of the coefficients will depend on the generating element, e.g. 1, 3, 9, 5, 4 when 3 is the generating element, but in all cases transpositions between any two digits occupying ranks not separated by more than three intermediate ranks can always be detected. For practical purposes this may be considered as quite satisfactory, but it is to be remarked that with $rs=2$, 6, 7 or 8 it is then possible to generate a complete group of order 10. In that case, transpositions of two digits whose ranks are not separated by more than eight intermediate ranks will always be detected.

Hence, for $p=11$; $rs=2$ is among the preferred values and this can be obtained either with $r=1$ and $s=2$, as in the above mentioned application, or with $r=2$ and $s=1$.

Another object of the invention is to reduce the maximum time of calculation required for each digit of a number which is to be verified against digital errors or transpositions.

In accordance with another characteristic of the invention, calculating means to calculate a digital function which can take any value out of $p$ different digital values from 0 to $p-1$, where $p$ is a digital integer, are characterised by the inclusion of a first and a second counter, each with at least $p$ stable and distinct conditions and each able to be stepped cyclically from one condition to the next, $p$ steps causing the return of the counter to its initial condition. Starting with the first counter in a first initial condition a signal is applied to both counters under the control of a bistable device which is in such condition that said signal is only effective with respect to the second counter to place the latter in a second initial condition. The first counter is then stepped at one rate, while simultaneously said second counter is stepped at $r$ times said rate, $r$ being an integer, means being provided to simultaneously stop this stepping action for both counters when said first counter reaches a first predetermined condition, as well as to place said bistable device into its second condition. A signal is applied to both counters under the control of said bistable device in its second condition but is only effective to place said first counter in a third initial condition, said second counter remaining in the condition attained. Said second counter is then stepped at one rate while simultaneously said first counter is stepped at $s$ times said rate, $s$ being an integer, means being provided simultaneously to stop the stepping action for both counters when said second counter reaches a second predetermined condition as well as to place said bistable device into its first condition. Thus, after each stepping action, the condition attained by the counter, stepped at $r$ or $s$ times the rate at which the other counter is simultaneously stepped, is a digital function of the initial conditions of both counters before said stepping action and is defined by $$y_{2i} \equiv (y_{2i-1} - rx_{2i-1}) \bmod. p \qquad (9)$$

$$x_{2i+1} \equiv (x_{2i} - sy_{2i}) \bmod. p \qquad (10)$$

where $x_{2i-1}$ is the number of steps required to bring the first counter from said first initial condition to said first predetermined condition, $y_{2i-1}$ is the number of steps required to bring the second counter from said second initial condition to said second predetermined condition, $y_{2i}$ is the number of steps required to bring the second counter to said second predetermined condition from the condition attained after having been stepped at $r$ times the rate of the first counter, $x_{2i}$ is the number of steps required to bring the first counter from said third initial condition to said first predetermined condition, and $x_{2i+1}$ is the number of steps required to bring the first counter to said first predetermined condition from the condition attained after having been stepped at $s$ times the rate of the second counter.

The repeated use of the Relations 9 and 10 gives the condition $x_{2n+1}$ of the first counter after $2n$ alternate operations, i.e. the second counter is first placed into condition $y_1$, the first counter is then placed in condition $x_2$, the second counter is then placed in condition $y_3$, the first counter is then placed in condition $x_4$, etc. The relation which is of a similar type as that given by (3) is $$x_{2n+1} \equiv (rs)^n x_1 + \sum_{i=1}^{i=n} (rs)^{n-i}(x_{2i} - sy_{2i-1}) \qquad (11)$$

After yet another condition $y_{2n+1}$ is impressed on the second counter, the new condition of the latter becomes $y_{2n+2}$ given by $$y_{2n+2} \equiv y_{2n+1} - rx_{2n+1} \qquad (11)$$

Here again, there can exist linear relationships between the conditions of the counters and the digits of the number. If $b_1$ and $b_{2n+1}$ are the digits respectively corresponding with the initial condition $x_1$ and the last condition $x_{2n+1}$ respectively (on the first counter), the Relation 4 applies as well as $$x_{2n+1} \equiv u_1 b_{2n+1} + u_0 \qquad (13)$$

Also, since the digits of even rank, starting with the highest rank are applied to the first counter and since the digits of odd ranks are applied to the second counter, one can write $$x_{2i} \equiv u_1 a_{2i} + u_0 \qquad (14)$$

$$y_{2i-1} \equiv v_1 a_{2i-1} + v_0 \qquad (15)$$

The Relation 11 between the various conditions of the counters referred to above can be transformed into a relation between the digits by using the Relations 4, 13, 14, 15. This gives $$b_{2n+1} \equiv (rs)^n b_1 + \frac{(rs)^n - 1}{u_1(rs-1)} s(ru_0 - v_0) + \sum_{i=1}^{i=n} (rs)^{n-i}\left(a_{2i} - \frac{sv_i}{u_1} a_{2i-1}\right) \qquad (16)$$

Here again, only the third term of the right-hand expression is a function of the various digits $a_1, a_2, \ldots a_{2n-1}, a_{2n}$ of a $2n$ digit number. Hence the parameters $u_0$, $v_0$, $b_1$ *and* $b_{2n+1}$ serve only to complicate the function to be satisfied by the digits, and one may as well have these four parameters all equal to 0. In that case, Relation 16 becomes $$\sum_{i=1}^{i=n} (rs)^{n-i}\left(a_{2i} - \frac{sv_1}{u_1} a_{2i-1}\right) \equiv 0 \qquad (17)$$

This relation is seen to be similar to (8) but as each digit is stored on one or the other counter, it is only necessary to step both counters until that on which the digit was not stored reaches its predetermined or 0 condition. Hence, the maximum time of computation is halved.

Relation 17 is valid after $2n$ such operations, i.e. the number comprises an even number of digits. After $2_{n+1}$ operations, thus for an odd number of digits Relation 12 should be used instead of Relation 11. Using (12) in conjunction with (11) as well as (4), (14), (15) and $$y_{2n+2} \equiv v_1 b_{2n+2} + v_0 \qquad (18)$$

one obtains:

$$b_{2n+2} \equiv -\frac{r}{v_1}(rs)^n(u_1 b_1 + u_0) - \frac{r(u_0 - sv_0)}{v_1}\,\frac{(rs)^n - 1}{rs - 1} + \cdots + a_{2n+1} - \frac{ru_1}{v_1}\sum_{i=1}^{i=n}(rs)^{n-1}\left(a_{2i} - \frac{sv_1}{u_1} a_{2i-1}\right) \qquad (19)$$

which is thus the equivalent of (16) in the case of an odd number of digits, i.e. $2n+1$. If the four parameters $u_0$, $v_0$, $b_1$ and $b_{2n+2}$ are all made equal to 0, (19) becomes $$a_{2n+1} - \frac{ru_1}{v_1}\sum_{i=1}^{i=n}(rs)^{n-i}\left(a_{2i} - \frac{sv_1}{u_1} a_{2i-1}\right) \equiv 0 \qquad (20)$$

Considering (17) and (20) it is seen that the coefficients which effectively multiply the digits of even rank starting with the highest rank, form a cyclic group generated by $rs$. If $rs$ is chosen so that a group of $p-1$ different coefficients is produced, the coefficients for the digits of odd rank will necessarily be contained in this group. As the digits of odd ranks are intermeshed with the digits of even rank, one will in general not be able to detect in all cases a transposition of two digits which are not separated by more than $p-3$ ranks, this being the most efficient arrangement. However, if $rs$ is chosen so as to generate a group of smaller order than $p-1$, it will be possible to select suitable values for $r$, $s$, $v_1$, and $u_1$ so that the coefficients of the digits of odd rank are different from those of even rank.

The following example is useful to explain this point. Considering (17) and assuming that $p$ is equal to 11 whereas $rs$ is equal to 4, the coefficients of the digits of even rank will be $$1, 4, 5, 9, 3 \qquad (21)$$

1 being the coefficient of the digit $a_{2n}$. These coefficients form a cyclic subgroup of order 5 out of the cyclic group of order 10 comprising all the numbers from 1 to 10. If $$\frac{-sv_1}{u_1}$$

is chosen among the complex of numbers $$2, 6, 7, 8, 10 \qquad (22)$$

which comprises those numbers from 1 to 10 which are not included in the cyclic subgroup mentioned above, it will be found that the coefficients of the digits of odd rank will all be taken out of this complex. For example, one may choose $s=2$, $u_1=5$ and $v_1=7$. In that case $$\frac{-sv_1}{u_1} \equiv 6$$

(taking the least positive residue with respect to 11) and the full group of coefficients becomes $$\underline{1}, 6, \underline{4}, 2, \underline{5}, 8, \underline{9}, 10, \underline{3}, 7 \qquad (23)$$

where the underlined coefficients are those of the digits of even rank, 1 being the coefficient of $a_{2n}$, while the other coefficients are those of the digits of odd rank, 6 being that of $a_{2n-1}$. In the particular case where $$\frac{-sv_1}{u_1}$$

would be chosen as equal to 2, the above series of coefficients would become:

$$1, 2, 4, 8, 5, 10, 9, 7, 3, 6 \qquad (24)$$

where the coefficients are in a geometrical progression generated by 2 (taking the least positive residues with respect to 11).

Although this does not constitute any disadvantage, it may be noted that the series of coefficients will not necessarily be the same, starting with that of the digit of lowest rank, in case the number of digits is odd. Taking the series given by (23) this would then become $$\left(\text{still with } rs \equiv 4 \text{ and } \frac{sv_1}{u_1} \equiv 6\right)$$

$$1, \underline{8}, 4, \underline{10}, 5, \underline{7}, 9, \underline{6}, 3, \underline{2} \qquad (25)$$

Only in the case of series such as the one given by (24) for an even number of digits, will the same series be applicable for an odd number of digits. From (17) and (20) it is clear that the particular condition is $$\frac{-sv_1}{u_1} \equiv \frac{ru_1}{v_1} \qquad (26)$$

or $$\left(\frac{ru_1}{v_1}\right)^2 \equiv \left(\frac{sv_1}{u_1}\right)^2 \equiv rs \qquad (27)$$

a particular solution of which is $$rs \equiv 4 \text{ and } -\frac{sv_1}{u_1} \equiv 2$$

It is of course not absolutely essential that the coefficients should always be different for any set of $p-1$ consecutive ranks, since transpositions between digits of widely separated ranks are unlikely to occur, but as this can in general be obtained without any increase in the equipment which is about to be described, one might as well select the values of the parameters in order to obtain the maximum safety against transpositions of digits.

The above-mentioned and other features and objects of this invention and the manner of attaining them will become more apparent and the invention itself will be best understood by reference to the following description of an embodiment of the invention taken in conjunction with the accompanying drawings, in which.

Using the coefficients given in (24) above, a set of numbers can be determined in which the units digit is the proof digit, the tens, hundreds, etc. digits representing the actual number. Thus, the number 25 would have a proof digit at the end which would be 4, making the number to be keyed up 254. It will be seen that $(1\times4)+(2\times5)+(4\times2)$ when divided by 11 will give a remainder of 0. The number 26 would have 2 as a proof digit. The proof digit for number 15 would be 8. Whenever the proof digit figures out to be 10, that number is not used, so as to avoid complicating the circuits. Thus 6, 14, 22, 30, 49, etc. are excluded from the numbers used.

In the electronic circuit to be described, a number including the proof digit is keyed up and the circuit will produce a signal if keyed correctly. If digits are transposed, as explained, the signal will not be produced.

Figure 1:
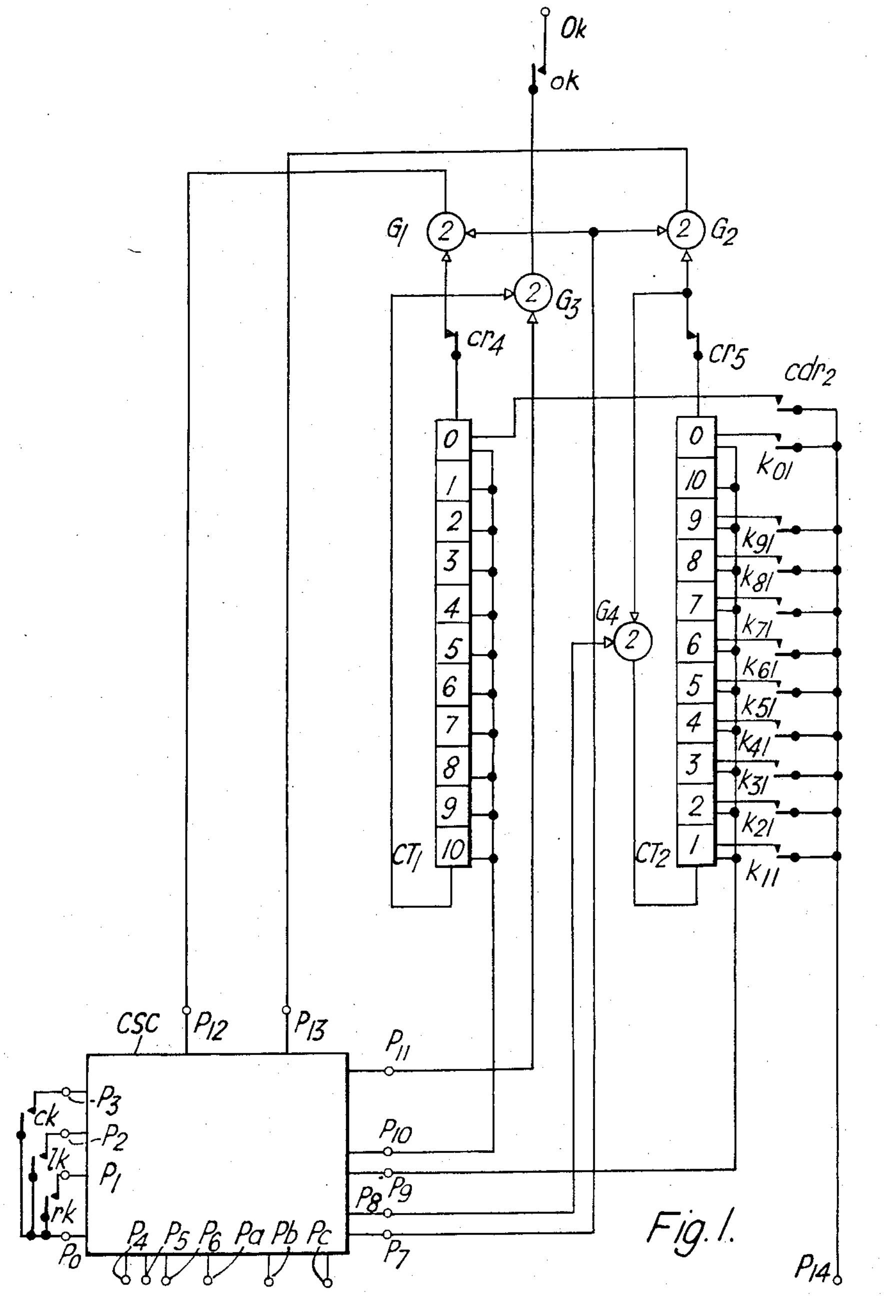
Fig. 1 is a diagram representing a first embodiment of the invention using two counters.
Figure 2:
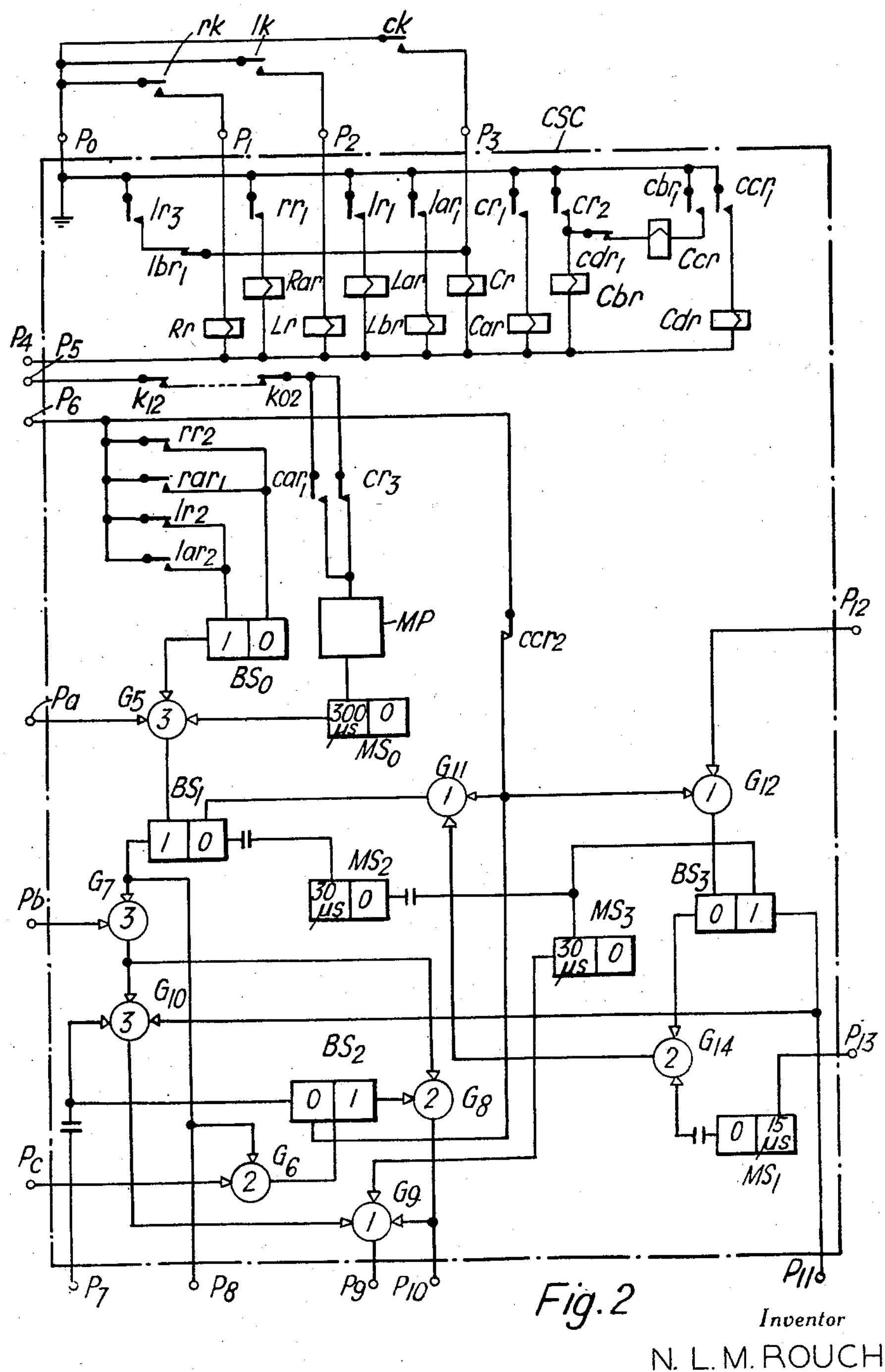
Fig. 2 is a diagram showing the details of a control circuit shown as a block schematic in Fig. 1.
Figure 3:
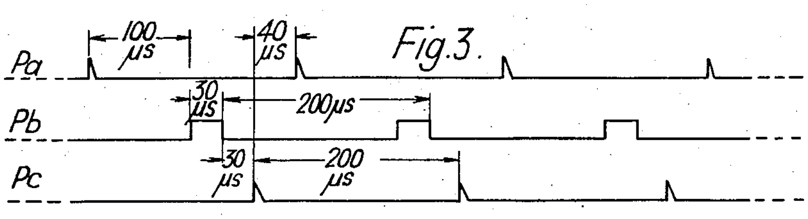
Fig. 3 is a diagram of wave forms of pulses used to operate the circuits of the various figures.

A first embodiment of the invention will be first described in relation to Figs. 1, 2, and 3.

Fig. 1 shows the two counters CT1 and CT2 both with eleven distinct electrical conditions. These counters are of the pattern shift register type and may for instance be realized in accordance with the U.S. patent to Odell, No. 2,649,502, issued August 18, 1953, where each stage comprises a cold cathode tube plus associated elements. In brief, such a counter operates in the following way. The cathodes of all the tubes are commoned together and the common cathode lead can be used to provide positive driving pulses each of which will cause the advancement of any pattern registered on the counter by a single step. The positive rise of the pulse causes the extinction of all the cold cathode tubes which are ionized and a pulse is created in each of the corresponding anode circuits. Such a positive pulse in the anode circuit of a tube is applied to the starter electrode of the next tube but will only become effective to strike this next tube, when the positive driving pulse at the commoned cathodes has disappeared.

Each counter such as CT1 is represented by a rectangle divided into eleven squares each indicating a possible stable condition or stage of the counter. In addition to the two counters CT1 and CT2, Fig. 1 shows four gates G1 to G4, which are represented by circles with input leads terminated by an arrow and pointing towards the centre of the circle and with an output lead also in line with the centre of the circle. The numeral inside the circle indicates the number of inputs which must be simultaneously energised to provide an output. The four gates shown are basic coincidence circuits or "And" gates. Fig. 1 also shows a control and starting circuit CSC as a block diagram which is detailed in Fig. 2. This will be used to control the two counters CT1 and CT2.

The operation following the depression of a digit key, consists in adding the value of the new digit to twice the value already stored in counter CT1, the result being expressed as the least non-negative residue with respect to 11. If it is assumed that CT1 is in condition 2, and that CT2 is put in the condition indicated by 8 as a result of the key corresponding to 8 being depressed, pulses will simultaneously be applied to CT1 and CT2 to drive them, but for each pair of stepping pulses applied to CT2, only a single stepping pulse will be applied to CT1. Therefore, after two pulses have been applied to CT1, this counter will now be in the 0 condition while CT2 will be in the first condition since CT2, as well in fact as CT1, is operated in ring counter fashion in order to obtain the least non-negative residues with respect to 11. The arrival of CT1 in its 0 condition will be detected and as a result, both CT1 and CT2 will now be driven in synchronism, i.e. for each pulse applied to a counter a pulse is also applied to the other counter. Therefore, when CT2 reaches its 0 condition, CT1 will now be in its first condition. The arrival of CT2 in its 0 condition can also be detected and the basic operation resulting from the depression of the digit key corresponding to 8 is now ended. Counter CT1 is now in its first condition instead of being originally in its second condition and this is the desired operation since $\{2(2)+8\} \text{ mod. } 11 \equiv 1$.

The control and starting circuit CSC represented in detail in Fig. 2, includes a number of relays, and a number of gates symbolically represented as already explained. Those gates with a 1 inside the circle are merely mixers, or buffers, or "Or" gates, while the gates with a 2 or 3 inside the circle are coincidence gates necessitating the simultaneous energisation of two or three inputs to deliver an output signal. In addition to the gates, bistable and monostable circuits are represented by rectangles divided into two squares. Input signals are shown as arriving on the long sides of the rectangle, while the output signals depart from the short sides of the rectangle. For the bistable circuits, one square is labelled 0 while the other square is labelled 1. It is assumed that an input signal to the square 0 will drive the bistable circuit to the 0 state (or leave it in that state) whereby an energising condition is provided at the output of the 0-square. A similar condition applies to the 1-square. Preferably, the 0 condition corresponds to the initial or normal condition eventually obtained after reset, as will be later explained. For the monostable circuits, 0 is the normal stable condition while the other square has been provided with an indication showing the time constant of the circuit, i.e. the time after which the circuit returns to the 0 condition after having been driven to its unstable condition by an input signal.

No particular reference will be made to the sign and shape of the pulses, nor to their amplitudes, except when necessary to obtain a clear understanding of the operation. A distinction is however made so far as necessary between steady and transient conditions. For transient conditions, the output lead is interrupted by a condenser sign to indicate that the signal is differentiated. For example, when the monostable circuit MS0 is driven to its unstable condition, a steady signal on the output lead will persist during 300 microseconds, the time constant of the monostable circuit. On the other hand, when the monostable circuit MS1 is driven to its unstable condition, for a period of 15 microseconds, a signal will only appear on the output lead when the monostable circuit returns to its stable condition, i.e. a short trigger pulse will be delivered 15 microseconds after the input pulse. Differentiated output signals should be assumed to be active for one polarity only, but no indication of this polarity is believed to be necessary for a symbolic representation, such as the one shown, since all monostable circuits using differentiated output signals are essentially delay circuits, i.e. the active differentiated output signal is that produced when the monostable circuit returns to its stable condition. In any case where there might be ambiguity, a special explanation will be given to define the active signal.

The circuits will now be described in relation to a particular example of an operator being required successively to key information appearing on cheques. For each cheque, first the account number should be keyed and then the amount. The proof circuit should be operative for the account number but it should not be operative for the amount since the amount will be assumed to be ordinary numbers whose digits do not necessarily satisfy the relation previously mentioned. The account numbers will be keyed while the typewriter carriage is on the left. Thereafter, a key will be depressed which will cause printing of the keyed figures and the displacement of the carriage to the right-hand position in which the amount can now be keyed. A shift to the right will take place only if the account number is proved to be correct. If not, printing will not take place in response to the operation of the key after typing the account number, the carriage will remain in the left-hand position and a signal will be given to the operator indicating that an error has been made. Upon being notified in this manner, the operator can only depress a cancel key which will erase the mechanically or electrically stored account number which was ready for printing, and which will also restore the proof circuit to the normal condition ready for making a new proof as the account number is rekeyed. After keying the amount, the carriage will be returned to the left, in readiness for keying the account number of the next cheque.

The storing and printing of the two types of numbers is however no part of the invention, and those details given above have been mentioned merely to explain briefly how the circuits shown can be fitted to a business machine of the type considered. When power is first applied to the circuits of Figs. 1 and 2 it is clear that some of the electronic circuits might be in an initial arbitrary condition. This would be the case for the bistable circuits such as BS0 in Fig. 2 and for the counters such as CT1 in Fig. 1 where an entirely arbitrary pattern of cold cathode tubes might initially be ionized. One of the tasks of the circuits CSC detailed in Fig. 2 is to place the circuits in their proper conditions so that operations can be started.

As long as the typewriter carriage (not shown) is in the left-hand position in which the account numbers to be verified can be keyed, the contact *lk* remains closed. Accordingly by considering Fig. 2, it is seen that a current will flow from ground at terminal P0 to a suitable potential at terminal P4 and through the winding of relay L*r* which energises. This energisation causes the following compulsory sequence of operations for the other relays. Following the operation of L*r*, L*ar*, and C*r* energise simultaneously through make contact $lr_1$ for L*ar* and through make contact $lr_3$ and break contact $lbr_1$ for C*r*. The operation of L*ar* causes the energisation of L*br* through make contact $lar_1$. The operation of relay C*r* causes the simultaneous energisation of relays C*ar* and C*br*, the first through make contact $cr_1$ and the second through make contact $cr_2$. Relay C*br* locks independently of C*r* through its make contact $cbr_1$ in series with the winding of C*cr* and break contact $cdr_1$. As a result of the operation of relay L*br*, C*r* releases followed by the release of C*ar* and the operation of C*cr* which is no longer short-circuited by contact $cr_2$ and which is now energised in series with C*br*. As a consequence of the operation of relay C*cr*, C*dr* energises causing the release of C*br* and C*cr* which last release produces the de-energisation of C*dr*. At this moment the sequence is completed and only relays L*r*, L*ar* and L*br* remain operated, relays C*r*, C*ar*, C*br*, C*cr* and C*dr* having been operated only momentarily.

During this sequence of operations for the electromagnetic relays, various operations have taken place in the electronic circuitry which operations occur at a much more rapid rate than those performed by the ordinary telephone type relays mentioned above.

Upon relay L*r* being energised, contact $lr_2$ is opened and the potential at terminal P6 which was applied through this contact to the bistable circuit BS0 is suppressed. This results in BS0 being placed in its "one" condition. This may for example take place in practice by causing the grid of one of the tubes forming a flip-flop to have its potential increased due to the opening of contact $lr_2$ increasing the resistance between this grid and ground, this grid being on the other hand connected to the H.T. supply through the anode of the other tube forming the flip-flop and this in conventional manner. If the tube, the potential at whose grid was so modified, was not already conductive, its plate cathode space will now be ionized while the other tube will become non-conductive. The operation of relay L*ar* will re-establish the connection to terminal P6 through make contact $lar_2$ but this will not have further effects.

When relay C*r* operates, contact $cr_3$ opens, interrupting the connection between terminal P5 and the circuit MP. This opening does not however affect the state of this last circuit. When relay C*ar* operates, the connection will be reclosed through make contact $car_1$ and this will create a pulse which is effective to pass through the circuit MP so as to trigger the monostable circuit MS0 which is connected to the output of MP, into its unstable condition and this for a period of some 300 microseconds.

The bistable circuit BS0 being in its 1 condition and the monostable circuit MS0 being in its unstable condition, the gate G5 is now ready to pass the first P*a* pulse which will appear at the corresponding terminal.

The P*a* pulses together with the P*b* and P*c* pulses are represented in Fig. 3. All three types of pulses have the same period of 200 microseconds but whereas the P*a* and the P*c* pulses are trigger pips, the P*b* pulses have a duration of some 30 microseconds. The P*b* pulses have their leading edges dephased by a half period, i.e. 100 microseconds, from the P*a* pips. The P*c* pips lag behind the P*a* pips by some 160 microseconds.

The time constant of 300 microseconds for the monostable circuits MS0 has been chosen to be somewhat larger than the period of 200 microseconds separating any P*a* pip from the next so that at least one P*a* pip, and at most two, will be able to pass through the gate G5 while MS0 is in its unstable condition, PS0 being in its 1 condition.

The single or first P*a* pip passing through G5 will trigger the bistable circuit BS1 into its 1 condition in the case that it was not initially in that condition. The P*b* pulse immediately following the starting P*a* pip, after 100 microseconds will then be able to pass through the gate G7 and will be applied in parallel to the gates G8 and G10. This P*b* pulse may be allowed either through G8, or through G10 or it will not be allowed to go through at all, this depending on the initial condition of the bistable circuits BS2 and BS3. Considering gate G8 only, if the first P*b* pulse is not able to go through that gate, it means that BS2 is initially in the 0 condition. However, the first P*c* pip which follows the first P*b* pulse, 60 microseconds after its leading edge, will be able to pass through gate G6 and trigger the bistable circuit BS2 which operates as a scale-of-two counter with a common input. Hence, if BS2 was initially in the 0 condition it will now pass to the 1 condition, whereby the second P*b* pulse will be able to pass through G8 and reach terminal P10 as well as terminal P9, the latter through the mixer G9. Accordingly, whatever happens with respect to the state of conductivity of the gate G10, for every pair of P*b* pulses, one will be able to reach terminals P10 and P9. By referring to Fig. 1, it is seen that the initial arbitrary patterns on the counters CT1 and CT2 will therefore both be advanced by one step for every pair of P*b* pulses passing through gate G7. It should be noted that at this moment relay C*r* is still operated as relay L*br* will take a sufficient time to operate so as to permit the electronic operations presently described. Consequently, contacts $cr_4$ and $cr_5$ are open and as the patterns on CT1 and CT2 are advanced, they do not merely circulate but progressively disappear.

If BS3 is initially in its 1 condition, this means that those P*b* pulses which are not allowed through G8 will be allowed through G10 and accordingly more pulses will appear at terminal P9 which means that the pattern on counter CT2 will disappear more rapidly than the one on counter CT1. This is however of no consequence whatever since the time during which this process takes place will be sufficient to permit an adequate number of P*b* pulses to be applied to each counter to wipe out the original patterns, and this irrespective of the initial conditions of BS2 and BS3.

The wiping out process for both counters will thus continue until relay C*cr* is energised following the release of relay C*r*. The time interval between the operation of relay C*ar* and the release of relay C*r* should be such as to permit somewhat more than 22 P*b* pulses to flow through the gate G7, and this while recirculation is prevented for both counters CT1 and CT2. A period of about 6 milliseconds or more would therefore be satisfactory. When relay C*cr* energises, contact $ccr_2$ is opened and a signal reaches the zero input of BS1 through the mixer G11 since terminal P6 is now disconnected from this input. This will have the same effect as the one described for the 1 input of BS0 (opening of contact $lr_2$) and BS1 will now be placed in its 0 condition, the P*b* pulses being no longer able to flow through the gate G7. A similar resetting action will take place for the bistable circuits BS2 and BS3 which will also be driven to their 0 condition, the last circuit through the mixer G12.

When BS1 is driven to its 0 condition, a trigger pulse is produced to drive the monostable circuit MS2 from its stable to its unstable condition in which it will remain for a period of 30 microseconds. This is for a purpose which will appear later but at the present time this operation will be of no consequence, since the trigger pulse generated by MS2 when it returns to its stable condition after 30 microseconds will feed the 1 input of BS3 but this will have no effect since BS3 is maintained in its 0 condition due to the opening of contact $ccr_2$, the opening period covering the pulse. Also, the trigger pulse generated by MS2 will drive a further monostable circuit MS3 from its stable to its unstable condition and this also for a period of 30 microseconds. MS3 will therefore apply a further pulse having the same length as the P*b* pulses to the counter CT2 through the mixer G9, but this will be without effect as this counter is already emptied (no tubes are ionized).

The purpose of the auxiliary circuit MP is to ensure that only a single pulse is applied to the monostable circuit MS0 upon the closure of contact $car_1$, or upon the reclosure of one of the ten key contacts such as $k_{12}$ in series with the parallel combination of $car_1$ and $cr_3$.

Vibrations of $car_1$ when C*ar* operates, of $cr_3$ when C*r* releases, assuming that $car_1$ would still vibrate, and strongest vibrations of the key contact, such as $k_{12}$, upon the release of the corresponding key, could start undesired operations.

Figure 4:
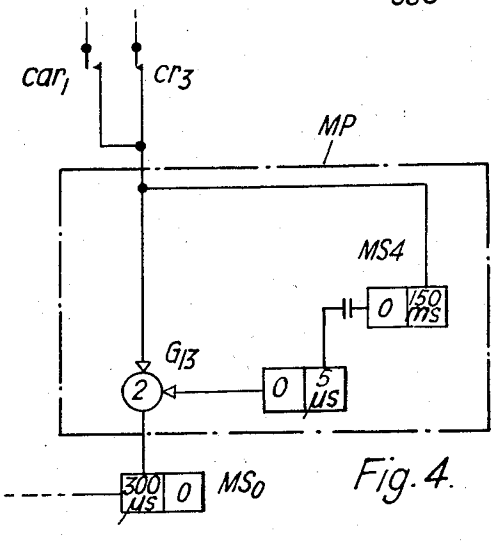
Fig. 4 is a diagram showing details of a particular circuit shown in Fig. 2 and designed to suppress undesirable effects of mechanical contact vibrations.

An embodiment of the circuit MP is shown in Fig. 4, and it is seen to include two monostable circuits MS4 and MS5 with respective time constants of 150 microseconds and 5 milliseconds. When the first pulse created by the closure of the contact $car_1$ is applied to the monostable circuit MS0 through the gate G13 which is conductive, since MS5 is in its stable condition, MS4 will be driven to its unstable condition. When MS4 returns to its stable condition, 150 microseconds afterwards, a trigger pulse is generated at its output which will drive MS5 into its unstable condition for a period of 5 milliseconds. During these 5 milliseconds, the gate G13 will be blocked and no further pulses can therefore reach MS0 during that time. A period of 5 milliseconds is chosen as an example and should be sufficient to cover the interval of time during which further closures of $car_1$ or of the key contacts such as $k_{12}$ might occur due to vibrations. A time constant of 150 microseconds has been chosen for MS4 as it is smaller than the time constant of MS0 and consequently, the gate G13 will be blocked before MS0 has returned to its normal condition from which it could again be triggered due to vibrations.

When contacts $cdr_2$ (Fig. 1) close as a result of the operation of relay C*dr*, a suitable potential at terminal P14 is applied to the 0 stage of counter CT1 to ionize the last tube of this counter. This will be the only tube which is conductive in counter CT1, no tubes being conductive in counter CT2, and the circuits are now ready for the keying of the first account number.

To fix ideas, the keying of the account number 254 will be assumed. This number is one of those satisfying the condition explained previously since $4(2)+2(5)+1(4)\equiv 0 \bmod 11$.

When the first digit 2 is keyed, the corresponding key contact $k_{21}$ will be closed to ionize the tube corresponding to the second stage of CT2. A second key contact $k_{22}$ will be opened (not actually shown in Fig. 2 but included in the series $k_{12} \ldots k_{20}$) without effect. When the key is released, contact $k_{21}$ will be the first to open, this being followed by the reclosure of contact $k_{22}$. As described previously for the closure of contact $car_1$, the closure of contact $k_{22}$ will be effective to trigger MS0 through MP and consequently, the next P*a* pip will trigger BS1 to its 1 condition.

The first P*b* pulse following the triggering of BS1 into its 1 condition will go through G7 but it will be unable to pass G8 and G10 since on the one hand BS2 is in its 0 condition and since on the other hand BS3 is also in its 0 condition. This last bistable circuit has a double function. Its first function is to distinguish between the arrival of CT1 in its 0 condition and the arrival of CT2 in its 0 condition. First it is the arrival of CT1 in the 0 condition which is to be detected since this will indicate that the correct result of the operation is now indicated by the position of CT2. After this, it is however required to return this result on CT1 and this will be done when CT2 arrives in its 0 condition. These two operations must however be distinguished since during the first, CT1 is driven at half the rate used for driving CT2, i.e. $r=2$, while during the second operation both counters are driven at the same rate, i.e. $s=1$. A second function of BS3 is to authorize the printing of the amount of the cheque if, and only if, the account number has been correctly keyed. This is performed in conjunction with the gate G3 (Fig. 1) which delivers an output signal when CT1 is in the 0 condition and while simultaneously, BS3 is in its 1 condition. As initially counter CT1 had to be placed in its 0 condition before keying the account number, BS3 is initially put in the 0 condition, so that it is not possible for the operator to obtain an O.K. signal permitting her to key the amount by merely omitting to key the account number. Also, since when the first digit of the account number is keyed, CT1 is in its 0 condition, the addition of twice 0 to the value of the first digit need not be performed and for the first digit only, one will first detect the arrival of CT2 in its 0 condition after driving CT1 and CT2 at the same rate, an operation which for the digits of lower rank would only be the second operation.

The first P*c* pip will triger BS2 to its 1 condition and accordingly the second P*b* pulse will be able to pass through gate G8 and reach terminals P9 and P10, the first through the mixer G9. Every even P*b* pulse will be able to reach these two terminals while all the odd P*b* pulses will be blocked by gate G10. Hence, both counters will be driven at the same rate until CT2 reaches its 0 condition while CT1 reaches its 2 condition. The initial conditions of the two counters have thus been interchanged as required and the P*c* pip following the P*b* pulse whose disapearance placed CT2 in its 0 condition, will trigger BS2 to the 0 condition and in so doing will deliver a trigger pulse at terminal P7 which will be able to pass through the gate G2 (Fig. 1) and reach terminal P13. This pulse will trigger MS1 to its unstable condition and after 15 microseconds a pulse will be fed to gate G14. Since BS3 is in the 0 condition, the pulse will pass through G14 and through the mixer G11, will trigger BS1 back to its 0 condition.

From that moment, the flow of P*b* pulses through gate G7 is stopped and counter CT1 will remain in its 2 condition which it has now attained. Counter CT2 will not however remain in its 0 condition, since in preparation for the keying of the next digit it is desirable to wipe out that counter altogether.

This will be performed due to a trigger pulse being generated by BS1 upon its return to the 0 condition. This triggers the monostable circuit MS2 and 30 microseconds afterwards, when MS2 returns to its stable condition a further trigger pulse is generated to trigger a further monostable circuit MS3, from its stable to its unstable condition. The triggering of MS3 will create a 30 microsecond pulse which will be applied to terminal P9 through the mixer G9. This will drive CT2 by one step, but since gate G4 (Fig. 1) is now blocked as BS1 has returned to its 0 condition, tube 0 in CT2 will be deionized without firing tube 1. Finally, another consequence of the trigger pulse generated by MS2 will be that BS3 will now be put in its 1 condition.

The next digit 5 will now be keyed resulting in BS1 being placed in its 1 condition in the same way as previously described. This time however, the first P*b* pulse following the P*a* pip which put BS1 in its 1 condition, will be able to pass not only the gate G7 but also the gate G10 since BS2 is in its 0 condition while at the same time BS3 is now in its 1 condition. Hence, the first P*b* pulse will be applied to terminal P9, through the mixer G9, and therefore to counter CT2 which as a result of the keying of the second digit 5 is in its 5 condition. This first P*b* pulse will therefore cause CT2 to pass to its 6 condition while CT1 remains in its 2 condition. Thereafter, the even P*b* pulses will pass through G8 to reach terminals P9 and P10 in order to drive both counters, but the odd P*b* pulses will continue to drive counter CT2.

In this manner it will be appreciated that after every even P*b* pulse, CT2 has been driven by twice as many P*b* pulses than CT1. With modifications to the circuit, the same result could of course be obtained by applying the odd P*b* pulses to both counters while the even P*b* pulses would only be applied to counter CT2. In that case, the operation would be terminated after an even P*b* pulse is applied only to counter CT2.

After counter CT1 has been driven for the second time, it will reach its 0 condition. At that moment, CT2 has been driven four times and has now reached its 9 condition.

As soon as CT1 has arrived in its 0 condition, it is to be remarked that gate G3 can deliver an output signal if the O.K. key is depressed causing the closure of the corresponding *ok* contact, since BS3 is in its 1 condition. However, this will only be a transient signal which will only last some 30 microseconds. It will be assumed that such a transient signal cannot be effective to register a correct proof which would cause the carriage to be positioned to the right to permit the keying of the amount of the cheque. Hence, the operator has no opportunity to skip a correct proof. The 30 microseconds duration mentioned above is due to the fact that 30 microseconds after the trailing edge of the P*b* pulse occurred, the moment at which tube 0 of CT1 became conductive, a P*c* pip will occur. This will pass through G6, trigger BS2 back to the 0 condition whereby a corresponding trigger pulse appears at terminal P7, which pulse can go through gate G1 and reach terminal P12 to trigger BS3 back to its 0 condition. Hence, from that moment it is already impossible to obtain an O.K. signal.

The bistable circuit BS3 having been returned to its 0 condition, the next P*b* pulse which during the first operation would have been able to go through G10 since BS2 is in its 0 condition, is blocked as a result of BS3 being in its 0 condition. Hence, from the moment that CT1 has arrived in its 0 condition, the counters will be driven by the same P*b* pulses, i.e. those alternate pulses flowing through G8. This is the second operation, i.e. the counters CT1 and CT2 exchange their conditions. Since CT2 was in the 9 condition when CT1 was in the 0 condition, after two P*b* pulses have driven the counters, CT2 will arrive in its 0 condition while CT1 will be placed in its 9 condition.

The P*c* pip which follows will trigger BS2 to its 0 condition and the trigger pulse generated at terminal P7 will this time pass through G2 to reach terminal P13. Since BS3 is in the 0 condition, a trigger pulse delayed by 15 microseconds by the action of MS1 will arrive at the 0 input of BS1, through the mixer G11, placing the bistable circuit in the 0 condition. As described for the first digit, the result of this will be to empty the counter CT2 after stopping both counters.

The third digit, i.e. 4, can now be keyed with CT1 in its 9 condition. The first operation will be essentially similar to that described for the keying of the second digit and after counter CT1 has been driven by 9 P*b* pulses, counter CT2 will have been driven by 18 P*b* pulses. Hence, since counters CT1 and CT2 were originally in their 9 and 4 conditions respectively, they are now both in their 0 condition. Accordingly, the trigger pulse which appears at terminal P7 as a result of the next P*c* pip triggering BS2 to its 0 condition, will be able to pass both through gate G1 and through gate G2. Simultaneous trigger pulses will therefore appear at terminals P12 and P13.

It will be remarked that during the advancement of the two counters, counter CT2 already reached its 0 condition while counter CT1 had only reached its 6 condition. Hence, a trigger pulse coinciding with a P*c* pip appeared at the output of G2 to which terminal P13 is connected. This trigger pulse at terminal P13 will trigger the monostable circuit MS1 but the pulse generated at the output of MS1 when this circuit returns to its stable condition after 15 microseconds will however be without effect since gate G14 is blocked by virtue of BS3 being in its 1 condition.

Returning now to the case of simultaneous pulses appearing at terminals P12 and P13, the pulse at terminal P12 will reach the 0 input of BS3 through the mixer G12 and BS3 will be placed into its 0 condition. At the same time, the pulse at terminal P13 will trigger the monostable circuit MS1 as previously explained but 15 microseconds afterwards, the pulse generated at the output of MS1 will be able to go through the gate G14 and the mixer G11 to trigger BS1 back into its 0 condition.

Here, the usefulness of the monostable circuit MS1 producing a delay of some 15 microseconds can be appreciated, since without this delay, BS3 would be triggered by the pulse at terminal P12 while simultaneously the pulse at terminal P13 would be applied to the gate G14. Hence, the passage of the pulse at terminal P13 through the gate G14 would not be ensured, or at any rate, one would not be sure of obtaining a pulse of suitable shape at the output of gate G14.

It should be observed that the essential thing is to avoid coincidence of the two pulses which may arise simultaneously at terminals P12 and P13 when both the counter CT1 and the counter CT2 are in their 0 positions. Accordingly, it would be possible to insert the monostable circuit MS1 between terminal P12 and the mixer G12, while terminal P13 would be directly connected to the gate G14. In this case however, the pulse at terminal P13 and directly connected to gate G14 would not be able to go through that gate since BS3 would still be in its 1 condition. After 15 microseconds, BS3 would be triggered into its 0 condition by the pulse at terminal P12, but at that moment, the pulse at terminal P13 would already have disappeared. In such a case BS1 would not be triggered to its 0 condition and P*b* pulses would continue to flow through gate G7 and through gate G8 for every alternate P*b* pulse corresponding to BS2 being in its 1 condition. Hence, a full cycle for both counters with P*b* pulses applied simultaneously to both counters would be made until both counters would again reach their 0 conditions at the same time. Then, the pulse at terminal P13 would be able to go through the gate G14 and the mixer G11 to trigger BS1 to its 0 condition, thereby stopping the second operation resulting from the keying of the last digit.

As shown above, this second operation will not take place in the case of the last digit, since both counters having reached their 0 conditions simultaneously, there is no point in performing the second operation which is merely an exchange of the conditions of the two counters. There would be a point for making this second operation even in the case of the last digit and for the sake of uniformity, if extra equipment was necessary to cover the case of the last digit. However, no extra equipment is needed and it may be deemed preferable to avoid this second operation in that case since there is a slight gain of time of two P*b* pulse periods, considering the maximum time to be reckoned for the operations following the depression of any digit key for any initial position of counter CT1.

When BS1 is returned to its 0 condition after the two counters CT1 and CT2 have reached their 0 conditions, a further pulse will be applied to CT2 in the manner previously described so as to empty that counter. Also, BS3 will be returned to its 1 condition.

Since a number satisfying the specified condition has now been keyed, it is possible for the operator to depress the O.K. key and obtain a signal from the output gate G3 which will reach the O*k* terminal through the *ok* contact corresponding to the key. In a manner not shown, the effect of this signal at this terminal will be to cause the printing of the account number which has been keyed and also to cause the displacement of the carriage to the right-hand position in which the amount mentioned on the cheque can now be keyed.

The carriage having been moved to the right-hand position, contact *lk* is opened and relay L*r* releases. In turn, relay L*ar* releases due to the opening of contact $lr_1$ and finally relay L*br* releases following the opening of contact $lar_1$. As contact $lr_3$ opens before the closure of contact $lbr_1$, relay C*r* has no opportunity to reenergise. Also, since contact $lr_2$ is reclosed before the reopening of contact $lar_2$ there is no opening of the connection between terminal P6 and the 1 input of the bistable circuit BS0, interruption which might otherwise interfere with the condition of this circuit. The reason is that as the carriage is now in the right-hand position, contact *rk* is now closed whereby a circuit is established between terminals P0 and P1 causing the energisation of relay R*r* which, at its contact $rr_2$ opens the normally closed connection between terminal P6 and the 0 input of BS0. In a manner previously described, this opening will now place BS0 in its 0 condition. The operation of relay R*r* produces the energisation of relay R*ar* by means of make contact $rr_1$ and the closure of contact $rar_1$ re-establishes the circuit between terminal P6 and the 0 input of BS0.

Since the bistable circuit BS0 is now in its 0 condition, the depression of the digit keys and the release thereof when keying the amount, although this will be effective in triggering the monostable circuit MS0 in a manner previously explained, will not be effective to start the proof operations since gate G5 will remain blocked. Since CT1 remains in its 0 condition during the keying of the amount and since BS3 remains in its 1 condition, a signal will remain at the output of the gate G3 whereby the same O.K. key can be used by the operator after having keyed the amount, in order to obtain a signal at the O*k* terminal which will shift the carriage. Means not shown will of course be provided so that a signal at the O*k* terminal shifts the carriage to the left-hand position when it is originally in the right-hand position and vice-versa. Hence, the circuits are so arranged that the same OK signal either gives permission to the operator to key the amount when the account number has been correctly keyed or gives permission to the operator to key the next account number when the previous amount has been keyed.

The return of the carriage to the left-hand position will again close the contact *lk* with the results already given while the reopening of contact *rk* will cause the release of relay R*r* followed by the release of relay R*ar*, this sequence preventing any further interruption of the connection between terminal P6 and the 0 input of BS0.

If a single wrong digit has been keyed or if a single transposition of any two different digits has been made, an error will certainly be detected, i.e. the faulty number will not be one of those satisfying the specified relation. In such a case, when the O.K. key is depressed, counter CT1 will not be in the 0 condition and an OK signal will not be obtained. The absence of this signal after the depression of the O.K. key can readily be used by means not shown to cause some kind of signal such as an optical one to be provided to the operator to indicate a fault. As the carriage has not moved following the depression of the O.K. key, this signal will indicate to the operator that a cancellation of the account number which has just been keyed but which has not yet been printed, should be performed.

The operation of the cancel key (not shown) will result in the closure of the contact *ck*, closure which will establish a circuit between terminals P0 and P3 to energise relay C*r*. The operations following the energisation of relay C*r* are exactly those which were described previously when this relay was operated as a result of the operation of relay L*r*. The cancel key will of course be depressed only momentarily and may be of the push button type. Care should however be taken that contact *ck* is closed for a time sufficient to permit the energisation of relay C*r* so that the remaining relays, i.e. C*ar*, C*br*, C*cr* and C*dr* can all be operated momentarily. The operation of the cancel key will thus permit to wipe out the counters $CT_1$ and $CT_2$ and reset all the circuits in readiness for rekeying the account number.

The time of the operations following the depression of a digit key is essentially determined by the sum of the times required for shifting the CT2 counter to its 0 condition while CT1 is shifted at twice the rate, plus the time required for the second operation consisting in shifting the counter CT2 until it reaches its 0 condition, counter CT1 being simultaneously shifted at the same rate. When a digit other than the first or the second is keyed, counter CT1 might initially stand in its 10 condition and accordingly 20 P$b$ pulses might be necessary to drive to its 0 condition, since only half of these 20 P$b$ pulses will be effective for advancing counter CT1. Moreover, although when CT1 is in its 0 condition when the first digit is keyed and that due to BS3 being in its 0 condition, the first operation is not performed, it may happen that CT1 is in its 0 condition when some other digit is keyed. In that case, since BS3 is now in its 1 condition, 22 P$b$ pulses will be necessary to make a complete cycle for CT1 and two complete cycles for CT2. Hence for the maximum time of the first operation one should reckon with 22 P$b$ pulses.

In turn, counter CT2 might have to be stepped from its 10 condition to its 0 condition by means of another set of 20 P$b$ pulses since only half of these are applied both to counter CT1 and to counter CT2. Altogether, one must thus reckon with a maximum time corresponding to 42 P$b$ pulses. An electronic counter of the pattern shift register type disclosed in the U.S. patent to Odell, No. 2,649,502, issued August 18, 1953, can readily work with stepping pulses at a period of 200 microseconds. Hence, 42 P$b$ pulses correspond only to 8.4 milliseconds which, even with very fast operators and with no slowing of the key operation, is sufficiently smaller than the time required by the operator to key one digit. However, if one should desire to use a pattern shift register of a type which cannot work at such relatively fast rate, the time interval corresponding to the 42 P$b$ pulses will become correspondingly larger and the difference between this time interval and the time interval between the keying of two digits might become too critical. In such border line cases, it might be of advantage to limit the operation time to something less than 42 P$b$ pulses, or in general to something less than $2(2p-1)$ P$b$ pulses if $p$ is a modulus other than 11. An obvious way to have a maximum time less than 42 P$b$ pulses would be to make every P$b$ pulse effective when CT2 is driven to its 0 condition while CT1 is driven at exactly the same rate. There is no fundamental reason why this should not be performed, and in fact the only reason why every alternate P$b$ pulse only is used for driving both counters when CT2 is being driven to its 0 condition, is one of circuit design. As shown in Fig. 2, by applying stepping pulses to both counters only when BS2 is in its 1 condition, one ensures that immediately after counter CT2 having reached its 0 condition, BS2 always returns towards the 0 condition which is the reset condition and in so doing generates a pulse at terminal P7 which will stop the flow of further stepping P$b$ pulses.

By modifying the circuit design, one could however reduce the maximum time of 22+20 P$b$ pulses to 22+10 P$b$ pulses.

A second embodiment of the invention will however be described as permitting the reduction of the maximum time to 20 P$b$ pulses.

Figure 5:
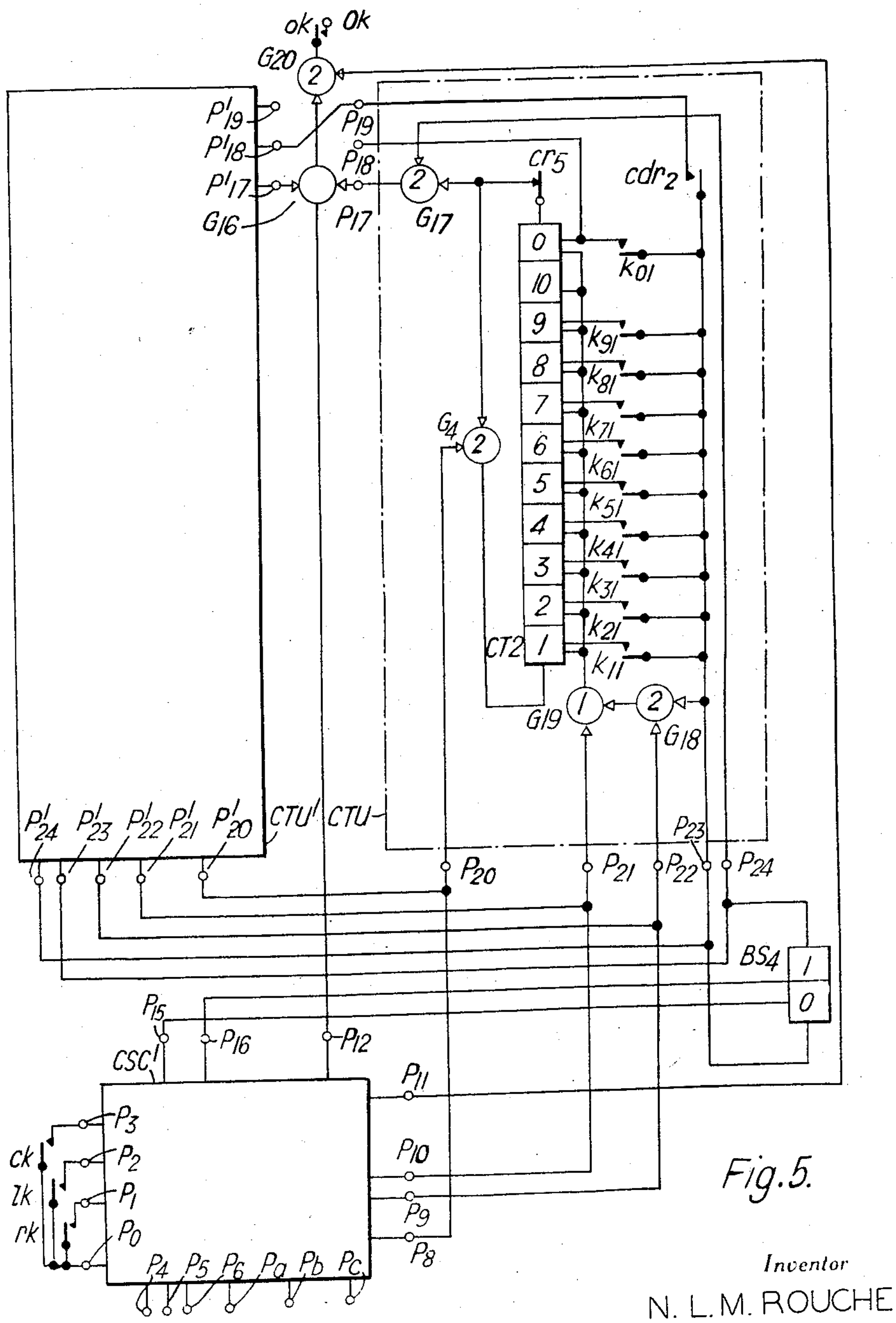
Fig. 5 is a diagram representing a second embodiment of the invention.

Referring to Fig. 5, the latter shows an arrangement wherein each of the two counters alternatively serves to register the incident digit instead of using a particular predetermined counter such as CT2 in Fig. 1 for that purpose. Fig. 5 shows a first counter unit CTU, which has been represented in detail, while the second counter unit CTU' has been shown as a block schematic since it is identical to the counter unit CTU. Each counter unit has eight outside terminals such as P17 to P24 for CTU and the corresponding terminals for CTU' are labelled from P'17 to P'24.

Figure 6:
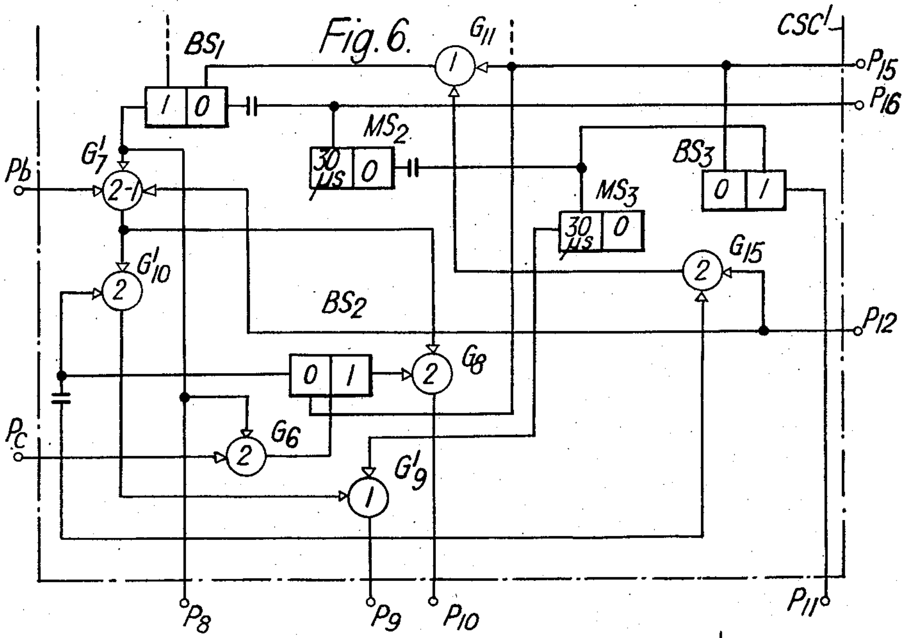
Fig. 6 is a diagram showing details of modifications to be brought to the circuit of Fig. 2 in order to fulfil the requirements of the circuits of Fig. 5.

The control and start circuit CSC' used in conjunction with the counter units CTU and CTU' is essentially similar to the circuit CSC detailed in Fig. 2 except for a few changes which have been shown in detail in Fig. 6.

The essential principle of the operation for the embodiment shown in Fig. 5 is to store the incident digit on one counter and merely to step the other counter to its 0 condition while the counter which has received the incident digit is stepped at twice the rate. This is the first operation which was performed with the arrangement of Fig. 1, but with that of Fig. 5 no further stepping takes place after this; the counter which has been stepped to its 0 condition is merely wiped out and the next digit is stored in that counter, this being followed by a stepping operation similar to the one just described. In other words, the two counters continuously interchange their functions. In order to define this exchange of functions as each digit is keyed, an additional bistable circuit BS4 has been used for the scheme of Fig. 5, this bistable circuit operating as a scale-of-two-counter with a common input in the same way as BS2 in Fig. 2.

The initial resetting operations when the carriage is in the left-hand position in readiness for the keying of an account number, are exactly similar to those previously described but by referring to Fig. 6 showing some modifications to the circuit of Fig. 2, it will be seen that when contact $ccr_2$ is opened to reset the bistable circuit, such as BS1, to its 0 condition, the potential at terminal P6 will no longer be applied to terminal P15 and the bistable circuit BS4 (Fig. 5) will also be set into its 0 condition.

The circuits having been properly reset, one can now describe the operations subsequent to the keying of the account number such as 254 previous used in conjunction with the circuit of Fig. 1. The fact that the scale-of-two-circuit BS4 is always reset to a predetermined condition before an account number is keyed, is used to always key the first digit of an account number in counter CT2 of the first unit CTU. Since BS4 is in its 0 condition, a suitable potential is present at terminal P23 which will be impressed on the starter electrode of tube 2 in counter CT2 when the key corresponding to the digit 2 is depressed, causing the temporary closure of contact $k_{21}$. It should be mentioned that the key contacts such as $k_{21}$ are duplicated in the unit CTU' so that a contact corresponding to $k_{21}$ will be closed thereby connecting terminal P'23 to tube 2 of counter CT1. Since BS4 is in its 0 condition there is however no suitable potential at this terminal which could cause tube 2 in CT1 to become conductive. It should also be mentioned that the positions or stages of counter CT1 which has not been shown in Fig. 5, are numbered in exactly the same way as the positions were numbered for counter CT1 shown in Fig. 1, i.e. the second position from the right corresponds to 1, the third position from the right corresponds to 2, etc., whereas the opposite numbering is used for counter CT2. This means, of course, that there is a distinction between the connections of the key contacts to the two units since the contact such as $k_{21}$ is connected to the second stage of counter CT2 starting from the left, while the corresponding key contact is connected to the third stage of counter CT1 starting from the right. Also, at the end of the resetting operations, when contact $cdr_2$ closes, the potential at terminal P23 will be applied to terminal P19 and from there to terminal P'18 which, as shown by the connection of terminal P18 in unit CTU is connected to the 0 stage of counter CT1 (not shown) in unit CTU'. On the other hand, the connection between terminals P'19 and P18 should not be made since the ionization of the 0 tube is only required initially for the counter, i.e. CT1, which does not receive the first digit of the account number. Hence, contact $cdr_2$ need not be duplicated in order to interconnect terminals P'19 and P18 which have only been shown in order to permit the description of the circuits by showing the detailed arrangement of unit CTU only.

As already explained, the release of the key corresponding to digit 2 will result in at least one P$a$ pulse being able to pass through gate G5 and thereby to trigger BS1 into its 1 condition. Referring to Fig. 6, gate G'7 has been modified with respect to gate G7 shown in Fig. 2. An additional inhibiting input shown by a black arrow and indicated by the numeral −1 inside the circle representing the gate, has been used. This inhibiting input is connected to terminal P12 which constitutes the output of a mixer G16 whose two inputs are connected to terminals P17 of unit CTU and to terminal P'17 of unit CTU'. Initially, counter CT1 (not shown) is in its 0 condition and accordingly, the gate corresponding to G17 delivers an output signal, this being due to BS4 being in its 0 condition, whereby terminal P'24 receives a suitable potential partly responsible for delivering an output at terminal P'17. On the other hand, an output cannot be present at terminal P17 since G17 is blocked by virtue of BS4 being in its 0 condition. The output signal initially present at terminal P12 is used to block gate G'7 with the result that the counters are not advanced.

However, the first P*c* pip following the P*a* pip which put BS1 in its 1 condition will trigger BS2 into its 1 condition. The unblocking of gate G8 will be without effect since G'7 is blocked. The second P*c* pip will return BS2 into its 0 condition and in so doing a pulse will be generated at the output of BS2 which, instead of being applied to terminal P7 as in Fig. 2, will be applied to a gate G15 which is controlled also by the potential present at terminal P12. This trigger pulse will pass gate G15 and through the mixer G11 will arrive at the 0 input of BS1 thereby triggering BS1 back to its 0 condition.

As before, a consequence of the return of BS1 to its 0 condition will be that a pulse is generated to trigger MS2 from its stable to its unstable condition. At the same time however, the trigger pulse at the output of BS1 will be applied to terminal P16 which Fig. 5 shows to be connected to the common input of BS4. Hence, at the same time that MS2 is triggered, BS4 moves into its 1 condition. This means that the gate in CTU' corresponding to G17 in CTU is blocked since the potential at terminal P'24 has disappeared and accordingly the output potential at terminal P12 also disappears whereby G'7 is no longer blocked. However, since BS4 can only be triggered as a consequence of BS1 having first been triggered, no further P*b* pulses are allowed through gate G'7. When MS2 returns to its stable condition after 30 microseconds, an output trigger pulse is generated, as before, to trigger MS3 as well as to place BS3 into its 1 G'7. When MS2 returns to its stable condition after 30 microseconds which is applied to terminal P9 through the mixer G9. In Fig. 5, terminal P9 is connected to terminal P22 of unit CTU and to the corresponding terminal P'22 of CTU'. In unit CTU, terminal P22 is connected to one input of the gate G18 whose other input is connected to terminal P23. A similar gate of course exists in unit CTU' with its second input connected to terminal P'24. Since BS4 has been triggered into its 1 condition, 30 microseconds before the appearance of the 30 microsecond pulse at terminal P9, gate G18 is blocked and the wiping out pulse will not be effective in unit CTU since it cannot reach the commoned cathodes through the mixer G19. In unit CTU' however, the gate corresponding to G18 is unblocked and the wiping out pulse will pass through the mixer corresponding to G19 to advance the information on counter CT1 by one step. Since CT1 is in its 0 condition, the 0 tube will be extinguished. As BS1 has already been returned to its 0 condition, there is no potential at terminal P8, which is connected to terminals P20 and P'20, to unblock the gates such as G4 in CTU. Hence, tube 0 of counter CT1 will be extinguished and no other tubes will be lit as required, in readiness for the keying of the second digit which will now be stored in counter CT1.

It will be appreciated that the inhibiting control exerted on gate G'7 is of some use since if the arrangement of Fig. 2 has been retained, the information in counter CT1 as well as the information in counter CT2 would have been stepped by every even P*b* pulse until tube 0 in counter CT1 would again be lit, whereafter the trigger pulse generated at the output of BS2 when this circuit is returned to its 0 condition would have stopped the operations by passing through gate G15 and the mixer G11 to reach the 0 input of BS1. In fact the advantage is small since using the previous arrangement would cause the maximum time of operation to correspond to 22 P*b* pulses, whereby the present arrangement of Figs. 5 and 6 will permit the limitation of the time of operations to 20 P*b* pulses.

The circuits are now ready for the keying of the next digit i.e. 5. Since BS4 is now in its 1 condition, tube 5 in counter CT2 cannot be ionized due to the depression of the key but tube 5 in counter CT1 will be made conductive. Since it is only tube 2 which is lit in CT2, gate G17 cannot deliver an output reaching terminal P12 through the mixer G16, and as the gate corresponding to G17 is also unable to deliver an output to terminal P12 due to BS4 being in its 1 condition, gate G'7 is no longer initially blocked. Therefore, as soon as BS1 has been triggered into its 1 condition following the release of the key corresponding to digit 5, a first P*b* pulse will be able to flow through gate G'7. This pulse will also pass through gate G'10 which incidentally is no longer controlled by the 1 condition of the bistable circuit BS3. This was useful in the case of the circuit of Fig. 1 in order to start immediately with the transfer operation, i.e. exchange of the counters' positions, and this for the first digit of the account number. In the present case however no such transfer takes place. The first P*b* pulse at the output of G'10 will reach terminal P9 through the mixer G9 and will therefore be applied to terminals P22 and P'22. Since BS4 is in its 1 condition, this first P*b* pulse will only pass through the gate in CTU' which corresponds to gate G18 and only counter CT1 will be driven from its condition 5 to its condition 4, CT2 remaining in its 2 condition.

The second P*b* pulse will be able to pass through G8 and reach terminal P10 which is connected to terminals P21 and P'21. Hence, this pulse will step both counters after passing through the mixer such as G19 for the counter CT2. This process will continue, i.e. the odd P*b* pulses driving CT1 and the even P*b* pulses driving both CT1 and CT2, until CT2 reaches its 0 condition. At that time, CT1 has reached its 9 condition. Counter CT1 went through its 0 condition during the stepping operation, since 18 P*b* pulses were needed but the gate G'17 could not however deliver an output since BS4 is in its 1 condition. On the other hand, when CT2 reaches its 0 condition, gate G17 delivers an output which results in the stepping operation being stopped due to the return of BS1 to the 0 condition, an additional pulse being fed by MS3 to counter CT2 in the manner previously explained.

The circuits are now ready for the keying of the last digit, i.e. 4, BS4 being again in its 0 condition. Accordingly, tube 4 of CT2 will be ionized, tube 9 in CT1 still being ionized as well. The P*b* pulses will be applied to the counters CT1 and CT2 in exactly the same manner as previously explained for the keying of the first digit. 9 P*b* pulses will be applied to CT1 during the time that 18 P*b* pulses are applied to CT2. Hence, both counters will reach their respective 0 conditions simultaneously after the 18th P*b* pulse and immediately thereafter, the next P*c* pip will trigger BS2 back to its 0 condition. Since gate G'17 delivers an output signal at terminal P'17, the trigger pulse at the output of BS2 will pass through G15 in the manner already explained and the operations will be stopped, the 0 tube in CT1 being deionized. Since the bistable circuit BS4 has now been placed in its 1 condition, the fact that CT2 is in its 0 condition will produce an output signal at terminal P17 which is applied to gate G20 through the mixer G16. Since BS3 is now in its 1 condition, an output signal is present at the output of G20. When the operator depresses her O..K key, the closure of contact *ok* will apply a potential at terminal O*k* which will indicate that the account number has been correctly keyed and cause the carriage to be moved to the right in preparation for the keying of the corresponding amount of the cheque.

For the embodiment which has just been described, the maximum time for the keying of one digit corresponds to 20 P*b* pulses only or more generally to $2(p-1)$ pulses, $p$ being the modulus. Thus the maximum time of operation to be reckoned with has been halved with respect to the maximum time required for the embodiment of Fig. 1.

By a modification of the circuit of Fig. 5, it is possible to still reduce this maximum of operation corresponding to the keying of one digit and a maximum time corresponding to 10 P*b* pulses or more generally $p-1$ pulses can be obtained.

Figure 7:
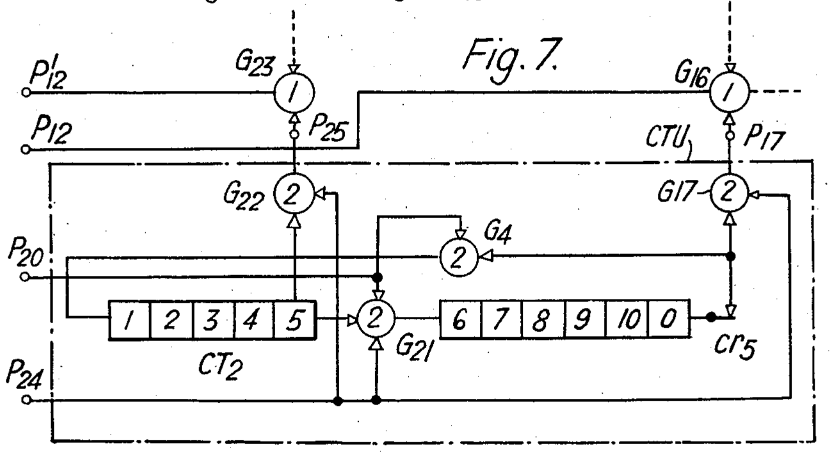
Fig. 7 is a diagram representing a third embodiment of the invention.

The modification to the circuit of Fig. 5 is shown in Fig. 7. This figure represents only those parts of Fig. 5 which need be modified the remaining parts being identical to those shown on that previous figure. Referring to Fig. 7, an additional coincidence gate B21 has been inserted between stage 5 and stage 6 of counter CT2. This additional gate G21 is controlled in a way similar to the control of gate G4 linking stage 0 with stage 1, by the potential appearing at terminal P20 and derived from terminal P8 of unit CSC′ of Fig. 6. Also, just as the output of stage 0 is applied to a gate G17, the output of stage 5 is also applied to a further gate G22 also controlled by the potential at terminal P24. The output of this gate G22 is connected to a terminal P25 leading to a mixer G23. The modifications shown for counter CT2 should also be made for CT1 and accordingly, the mixer G23 also receives an input from a terminal P′25 (not shown) which in unit CTU′ corresponds to terminal P25 in unit CTU.

The output of the additional mixer G23 is connected to a further terminal P′12 in the control circuit CSC″ (Fig. 8) which should be slightly modified with respect to CSC′ shown in Fig. 6 and which already showed a modification of the original control circuit CSC shown in Fig. 2. Just as terminal P12 constitutes the input of the gate G15 whose other input is connected so as to receive the trigger pulses generated when BS2 returns to the 0 condition, terminal P′12 constitutes one input of a further gate G′15 whose other input is constituted by exactly the same pulses. The outputs of the gates G15 and G′15 are both connected to the mixer G′11 but in addition, the output of gate G15 is connected to the 0 input of a further bistable device BS5, while the output from G′15 is connected to the 1 input of this bistable device. Further, the signal at terminal P12 again exerts an inhibiting action on the gate G″7 and the same applies for the signal at terminal P′12. Whenever a signal is present at terminal P12 or at terminal P′12, the gate G″7 will therefore be blocked. Finally, the pulse which is produced by the monostable circuit MS3 can pass through the gate G24 when BS5 is in its 1 condition to the mixer G25 whose other input is constituted by the output of gate G8, and whose output is connected to terminal P10.

Figure 8:
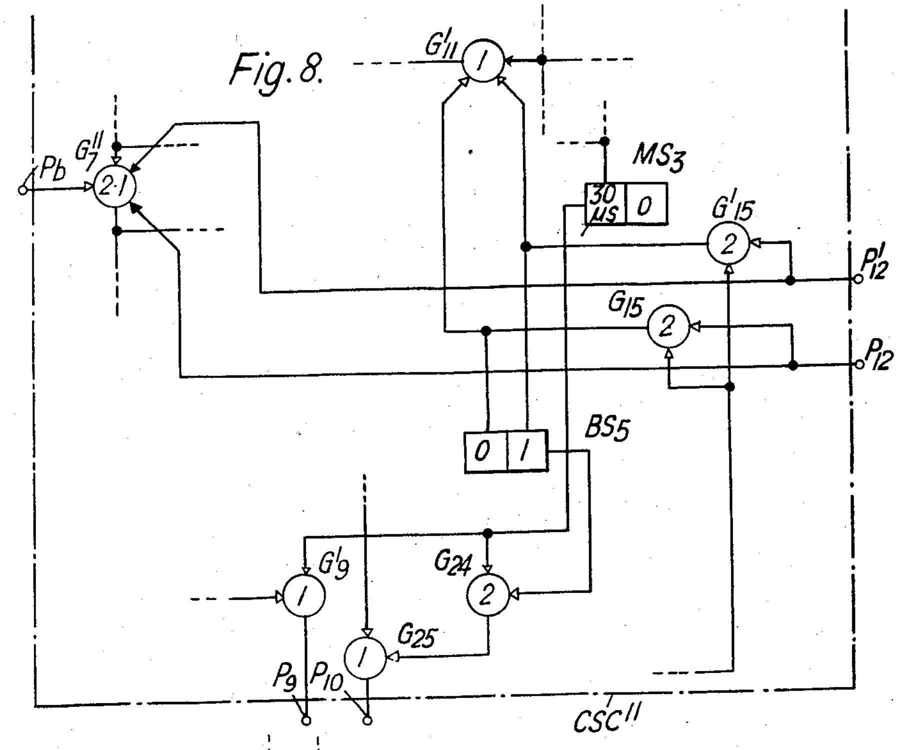
Fig. 8 is a diagram showing details of further modifications to be brought to the circuits of Figs. 2 and 6 in order to fulfil the requirements of the circuit of Fig. 7.

The effect of the changes which have just been described is the following. When CT2 has to be advanced to its 0 condition, but if it is at least six steps away from this condition, i.e. in conditions 1, 2, 3, 4 or 5, condition 5 will act as the detecting condition instead of the 0 condition. Since to the six pulses needed to advance CT2 from its 5 condition to its 0 condition correspond twelve advancing pulses for the other counter CT1, this counter will not be advanced by the right number of P*b* pulses, i.e. twice the number used to drive CT2. However, since the least non-negative residues with respect to 11 are the quantities which matter, CT1 can still reach the right condition by being fed with one additional P*b* pulse after CT2 has reached its 5 condition. When this is the case, and assuming of course that BS4 is in its 1 condition, the potential at terminal P24 in conjunction with the fact that tube 5 of CT2 is ionized, will cause a signal to appear at terminal P25 and to reach terminal P′12 through the mixer G23. The immediately following P*c* pulse will cause a trigger pulse to be generated by BS2 when returning to its 0 condition and this trigger pulse will be able to pass through gate G′15 (Fig. 8). From the output of G′15, this pulse will pass through the mixer G′11 and stop the advancement of the two counters in the manner previously described. This trigger pulse will also place BS5 in its 1 condition or leave it in that state if it was originally in the 1 condition. Hence, when MS3 delivers an output pulse of 30 microseconds, this will be applied not only to terminal P9 through the mixer G′9 in order to deionize tube 5 in CT2, but also to terminal P10 through the gate G24 and the mixer G25. Hence, counter CT1 in unit CTU′ will receive an additional P*b* pulse as required and will thus reach the correct condition. Since G21 is controlled by the potential at terminal P20, which is connected to terminal P8, since there is also no potential at terminal P24, which performs an additional control on G21, BS4 having been returned to its 0 condition, the de-ionization of tube 5 in CT2 will not produce the ionization of tube 6 and the counter CT2 will thus be ready for the keying of the next digit. The additional control on gate G21 by the potential at P24 will however permit counter CT1 to reach its position 5 due to the extra pulse, if it stood in position 6 when the normal advancement was stopped. In unit CTU′ (not shown) the gate corresponding to G21 is, of course, located between stage 6 of counter CT1 and stage 5, since for that counter the stages are numbered in reverse order with respect to the stages of counter CT2, i.e. the same numbering as in Fig. 1. Hence, for counter CT1, despite the absence of a potential at terminal P′20 since BS1 is now back in its 0 condition, the potential at terminal P′24 due to BS4 having been placed in its 0 condition will allow tube 5 to be ionized in counter CT1 if the pulse generated by MS3 causes the de-ionization of tube 6 in CT1. On the other hand, if counter CT1 has to pass from its 6 condition to its 5 condition while the P*b* pulses are being applied, despite the fact that there will be no potential at P′24 since BS4 is in its 1 condition, the fact that BS1 is in its 1 condition permits the gate corresponding to G21 to be conductive.

The arrangement of Fig. 7 could of course be applied to the arrangement of Fig. 1, but when it is applied to the arrangement of Fig. 5, one obtains the smallest maximum number of P*b* pulses or more generally $p-1$.

It will be observed that the method of sending P*b* pulses to one counter and half the number of P*b* pulses to the other counter by means of the bistable circuit BS2, has the advantage that the counters are driven by identical pulses both as to their period and as to their duration. Hence, if there exists some kind of optimum duration for driving the counters in the most satisfactory way, this optimum duration is always used. Also, BS2 is always returned to its original condition whatever number of P*b* pulses is applied to the counters, and this means that after the keying of any digit, the arrangement is ready to be used again without the eventual reset of BS2.

It is evident that the arrangements described can also be used to calculate the so-called proof digit after any normal number has been keyed. This can be done for all three embodiments in a manner similar to that described in the Linsman application, Serial No. 484,715, above mentioned.

It is also clear that the number of stages of the counters need not necessarily be equal to the number of distinct conditions. Four-stage binary counters using feedback connections to obtain cycles of 11 conditions could, for example, be used.

Finally, while the embodiments described have used values of $p=11$ and of $r=2$ and $s=1$ (Fig. 1), $r=s=2$ (Figs. 5 and 7), the invention is obviously not limited to these particular values as will be clear from the beginning of the description.

While the principles of the invention have been described above in connection with specific apparatus, it is to be clearly understood that this description is made only by way of example and not as a limitation on the scope of the invention.

What is claimed is:

1. Calculating equipment, for calculating a digital function which can take any value out of $p$ different values from zero to $p-1$, where $p$ is a predetermined integer, comprising a first counter and a second counter, each counter having at least $p$ stable and distinct conditions and adapted to be stepped cyclically from one condition to the next, $p$ steps causing the return of the counter to its initial condition, means for setting said counters in their initial conditions, means for causing said first counter to step at one rate while simultaneously causing said second counter to step at a multiple of the stepping rate of said first counter, means for simultaneously stopping the stepping action of both counters when said first counter reaches a predetermined condition, means responsive to said first counter reaching said predetermined condition for causing said second counter to step at one rate and simultaneously causing said first counter to step at a multiple of said one rate, and means for simultaneously stopping the stepping action of both counters when said second counter reaches a predetermined condition.

2. Calculating equipment, as defined in claim 1, in which the means for causing the counters to step at different rates comprises an auxiliary counter and means for controlling the stepping of the counters dependent upon the condition of said auxiliary counter.

3. Calculating equipment for calculating a digital function which can take any value out of $p$ different digital values from zero to $p-1$, where $p$ is a predetermined integer, comprising a first counter and a second counter, each of said counters having at least $p$ stable and distinct counting conditions and each adapted to be stepped cyclically from one condition to the next, $p$ steps causing the return of the counter to its initial condition, means for setting said first counter in an initial condition, means for setting said second counter in an initial condition, means for causing said first counter to step at one rate while simultaneously causing said second counter to step at $r$ times said rate, $r$ being an integer greater than 1, means responsive to said first counter reaching a predetermined condition for simultaneously stopping the stepping action of both counters, means controlled by said first counter in its first predetermined condition for thereupon causing said second counter to step at one rate while simultaneously causing said first counter to step at $s$ times said rate, $s$ being an integer greater than 1, and means responsive to said second counter reaching a predetermined condition for simultaneously stopping the stepping action for both counters, whereby the condition finally attained by said first counter is a digital function of the initial conditions of said first and said second counters defined by $$x_{i+1} \equiv s(rx_i - y_i) \text{ mod. } p$$

where $x_1$ is the number of steps required to bring said first counter from its initial condition to its first predetermined condition, $y_1$ is the number of steps required to bring said second counter from its initial condition to its first predetermined condition, and $x_{i+1}$ is the number of steps required to bring said first counter from the condition finally attained to its predetermined condition.

4. Calculating equipment for calculating a digital function which can take any value out of $p$ different digital values from zero to $p-1$, where $p$ is a predetermined integer, comprising a first counter and a second counter, each having at least $p$ stable and distinct conditions and adapted to be stepped cyclically from one condition to the next, $p$ steps causing the return of the counter to its initial condition, a bi-stable device, means controlled by said bi-stable device being in a first condition for applying signals to said second counter to cause it to assume an initial condition, means controlled by said bi-stable device for applying signals to said counters for causing said first counter to step at one rate while simultaneously causing said second counter to step at $r$ times said rate, $r$ being an integer greater than 1, means responsive to said first counter reaching a first predetermined condition for simultaneously stopping the stepping action of both counters, means responsive to said stopping means for causing said bi-stable device to assume its second condition, means controlled by said bi-stable device being in its second condition for applying signals to said first counter only to cause said first counter to step to another condition, means responsive to said first counter being in said other condition for operating said bi-stable device to cause signals to be applied to said counters for causing said second counter to step at one rate while simultaneously causing said first counter to step at $s$ times said rate, $s$ being an integer greater than 1, means responsive to said second counter reaching a predetermined condition for simultaneously stopping the stepping action of both counters and for causing said bi-stable device to assume its first condition, whereby after each stepping action, the condition attained by the counter stepped at $r$ or $s$ times the rate at which the other counter is simultaneously stepped is the digital function of the initial conditions of both counters before said stepping action defined by $$Y_{2i} \equiv (Y_{2i-2} - rx_{2i-1}) \text{ mod. } p$$
$$x_{2i+1} \equiv (x_{2i} - 5y_{2i}) \text{ mod. } p$$

where $x_{2i-1}$ is the number of steps required to bring the first counter from its initial condition to its predetermined condition, $y_{2i-1}$ is the number of steps required to bring said second counter from its initial condition to its predetermined condition, $y_{2i}$ is the number of steps required to bring said second counter to another condition from the condition attained after having been stepped $r$ times the rate of said first counter, $x_{2i}$ is the number of steps required to bring said first counter from its other condition to its predetermined condition, and $x_{2i+1}$ is the number of steps required to bring the first counter to its predetermined condition from the condition attained after having been stepped at $s$ times the rate of said second counter.

5. Calculating equipment, as defined in claim 3, wherein $p$ is odd and either $r$ or $s$ is equal to 2 mod. $p$ or both $r$ and $s$ are equal to 2 mod. $p$, further comprising means for stopping a counter which is being stepped at half the rate at which the other counter is being stepped when it reaches a third predetermined condition, and means for stopping the other counter after it has taken one additional step, $$\frac{p+1}{2}$$

steps being required to bring the first mentioned counter from its third predetermined condition to its first or second predetermined condition.

6. Calculating equipment, as defined in claim 5, in which the means for causing the counters to step comprises a scale-of-2 counter, means for normally maintaining said scale-of-2 counter in a first condition, means responsive to said scale-of-2 counter being in said first condition for causing a signal to be applied to the second counter to cause it alone to step, means responsive to said scale-of-2 counter being in its second condition for causing a signal to be applied to both said counters to cause them both to step, and means for changing the condition of said scale-of-2 counter each time said second counter steps, whereby when the stepping is stopped upon said first counter reaching its predetermined condition, said scale-of-2 counter is always back to its first condition.

7. Calculating equipment, as defined in claim 3, in which the means for causing the counters to step comprises a scale-of-2 counter, means for normally maintaining said scale-of-2 counter in a first condition, means responsive to said scale-of-2 counter being in said first condition for causing a signal to be applied to the second counter to cause it alone to step, means responsive to said scale-of-2 counter being in its second condition for causing a signal to be applied to both said counters to cause them both to step, and means for changing the condition of said scale-of-2 counter each time said second counter steps, whereby when the stepping is stopped upon said first counter reaching its predetermined condition, said scale-of-2 counter is always back to its first condition.

References Cited in the file of this patent

UNITED STATES PATENTS

| | | |
|---|---|---|
| 2,634,052 | Block | Apr. 7, 1953 |
| 2,684,199 | Starreveld | July 20, 1954 |
| 2,684,201 | Starreveld | July 20, 1954 |

FOREIGN PATENTS

| | | |
|---|---|---|
| 709,407 | Great Britain | May 26, 1954 |